United States Patent [19]

Heitzig

[11] Patent Number: 4,673,169
[45] Date of Patent: Jun. 16, 1987

[54] ELASTIC MOTOR MOUNT
[75] Inventor: Jürgen Heitzig, Hanover, Fed. Rep. of Germany
[73] Assignee: Continental Gummi-Werke Aktiengesellschaft, Hanover, Fed. Rep. of Germany
[21] Appl. No.: 773,448
[22] Filed: Sep. 6, 1985
[30] Foreign Application Priority Data
Sep. 12, 1984 [DE] Fed. Rep. of Germany ....... 3433421
[51] Int. Cl.⁴ .................. F16F 15/04; F16M 13/00
[52] U.S. Cl. .................. 267/140.1; 248/566; 267/8 R
[58] Field of Search .......... 267/8 R, 35, 136, 140.1, 267/140.2, 140.3, 141.6, 152, 153, 63 R, 57.1 R, 57.1 A; 180/300; 248/566, 562, 636

[56] References Cited
U.S. PATENT DOCUMENTS 2,460,829  2/1949  Ivanovic ..................... 267/140.2
2,705,118  3/1955  Beck ............................ 267/152 X
4,577,842  3/1986  Shtarkman .................. 267/140.1

FOREIGN PATENT DOCUMENTS 2360857  6/1975  Fed. Rep. of Germany ...... 267/152
3008168  9/1981  Fed. Rep. of Germany .
3116721  11/1982 Fed. Rep. of Germany .
2394715  2/1979  France ........................... 267/35

Primary Examiner—Andres Kashnikow
Assistant Examiner—Robert J. Oberleitner
Attorney, Agent, or Firm—Becker & Becker, Inc.

[57] ABSTRACT

An elastic motor mount having a closed-off hollow space which is formed within a housing. With the aid of a regulatable pressure pump, the hollow space can selectively be filled with a damping fluid from a tank disposed externally of the mounting. It is therefore possible to randomly affect the stiffness of the shock absorption and the damping properties, and to efficiently reduce undesirable vibrations which might occur without permanently adversely affecting the acoustical property.

4 Claims, 3 Drawing Figures

ELASTIC MOTOR MOUNT

BACKGROUND OF THE INVENTION

1. Field of the Invention

The present invention relates to an elastic motor mount having at least one elastic shock-absorption element, each of which is operational within a common fixed housing between the latter and a connecting element which is movable relative to the housing and absorbs motor weight.

2. Description of the Prior Art

Such mountings, which are used to elastically support in particular the engine in a motor vehicle, operate, without any other intermediate means, exclusively on the basis of the elasticity of the shock-absorption element which is rigidly connected on both sides to the housing and to the associated connecting element. Since this shock-absorption element interrupts any direct connection between the vehicle parts between which shock-absorption exists, namely the motor and the chassis or body, the mountings, as a result of the highly elastic properties of the material of their shock-absorption elements, simultaneously represent extremely effective noise insulators which practically completely eliminate the transmission of acoustical vibrations originating from the engine. In this regard, they are also superior to motor mounts equipped with hydraulic and other damping devices. Unfortunately, these heretofore known motor mounts have a drawback which outweighs the advantage of their simple construction. This drawback, which appears upon impact, is the long, echoing, soft vibration behavior, accompanied by the appearance of resonance and the tendency to increase the amplification of annoying vibrations.

An object of the present invention is to impart to conventional elastic mountings, by means of a novel configuration, in addition to the known acoustical retarding effect, auxiliary damping properties as desired or needed.

BRIEF DESCRIPTION OF THE DRAWINGS

This object, and other objects and advantages of the present invention, will appear more clearly from the following specification in conjunction with the schematic drawings, in which.

SUMMARY OF THE INVENTION

The elastic motor mount of the present invention is characterized primarily by a closed-off hollow space which is formed within the housing; this hollow space communicates with an external source of damping fluid so that varying amounts of this fluid can be received in the hollow space.

Pursuant to a specific embodiment of the present invention, the hollow space is formed between the walls of the housing and the connecting element. The hollow space may also be provided with an external connecting fitting which is in constant communication with a regulatable pressure pump which conveys the damping fluid in either direction.

The present invention allows the possibility of randomly being able to externally influence the function of the elastic motor mount, and of being able to selectively switch between a damped and undamped characteristic. During normal driving operation on a smooth street, the acoustically favorable, purely elastic, undamped shock-absorption will generally be preferred. However, the novel construction of the mounting makes it possible at any time, by pumping a damping fluid into the free hollow space of the mounting, to bring the damping mechanism out of this undamped state into any gradation of damping. An example of an auxiliary aid for this purpose is a pressure pump such as used for the customary windshield washing device. Conversely, after the vibrations have faded away, the damping fluid can be withdrawn from the hollow space, with the operation thus being returned to a normal undamped shock-absorption having the desired low noise level.

Pursuant to a further specific embodiment of the present invention, the hollow space can be delimited at least partially by flexible elements which are supported by the housing and/or the connecting element.

DESCRIPTION OF PREFERRED EMBODIMENTS

Figure 1:
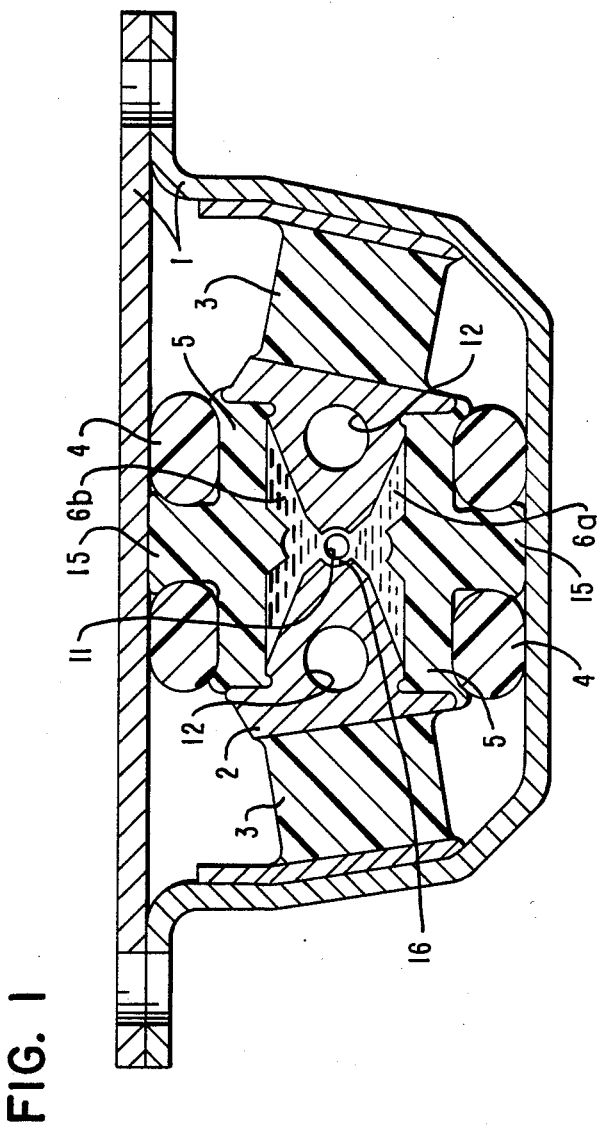
FIG. 1 is a view showing a longitudinal section through one inventive embodiment of a motor mount for a motor vehicle.
Figure 2:
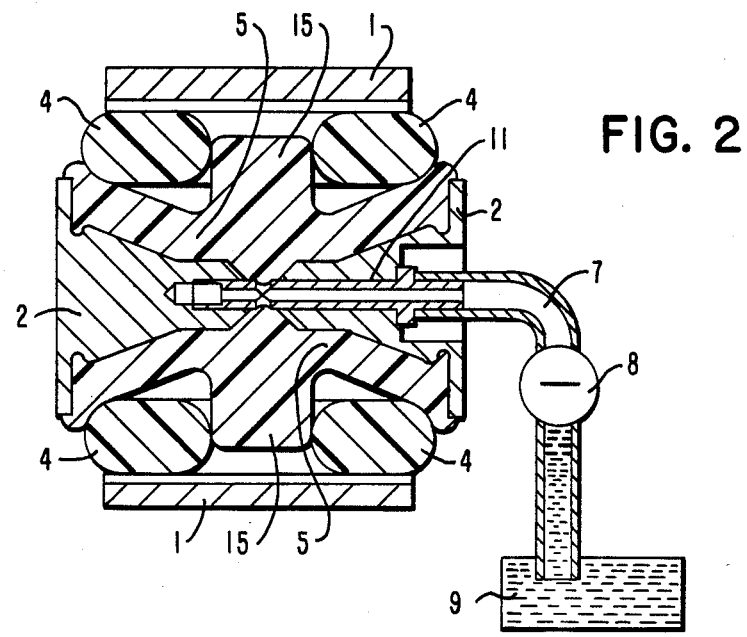
FIG. 2 is a view showing a cross-section through the motor mount of FIG. 1 in the pressureless state.
Figure 3:
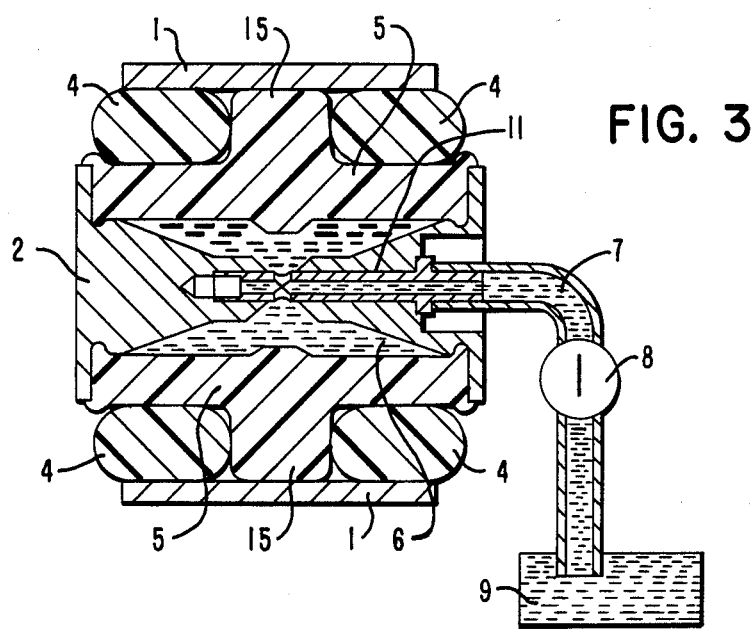
FIG. 3 is a view showing a cross-section through the motor mount of FIG. 1 in a positive pressure state.

Referring now to the drawings in detail, the illustrated mounting essentially comprises a bracket-like metal housing 1, a metallic inner connecting element 2, and elastic shock-absorption elements 3 disposed between the housing 1 and the element 2, and bonded therewith. In addition to accommodating the elements 2 and 3, the housing 1 at the same time serves for securely attaching the mounting to the non-illustrated body or chassis of the motor vehicle. The connecting element 2, which is elastically yieldingly supported relative to the housing via the shock-absorption element 3, directly absorbs the proportionate weight of the motor; for securing the support construction, the connecting element 2 is provided with bores 12 which pass therethrough. In the vertical direction, the play of the connecting element 2 is limited by associated surfaces of the housing 1 under the interposition of elastic stop cushions 4. Flexible diaphragms 5 which are securely connected to the connecting element 2 serve, on the one hand, to receive and guide the stop cushions 4, for which purpose they are each provided with a formed-on centering extension 15; on the other hand, the diaphragms 5 extend over a hollow space divided into chamber portions 6a and 6b formed by recessed surface portions of the connecting element 2. With the exception of a connecting fitting 11 in an overflow opening 16, the hollow space 6 divided into chamber portions 6a and 6b is closed off toward the outside. By means of a conduit 7 and a pressure pump 8, the connecting fitting 11 is in constant communication with a tank 9 which contains a damping fluid. As needed, the pump 8 can be operated by an associated drive motor in order to either convey damping fluid from the tank 9 into the hollow space 6 (FIG. 3), or to withdraw damping fluid from the hollow space 6 (FIG. 2). The fluid introduced into the hollow space 6 acts as a stiffening element with regard to the freedom of motion of the shock-absorption element 3 by displacing the stop cushion 4 and providing damping as well as spring forces.

It is to be understood that the inventive mounting can basically be used for any elastic mounting system.

Furthermore, the present invention is, of course, in no way restricted to the specific disclosure of the specification and drawing, but also encompasses any modifications within the scope of the appended claims.

What I claim is:

1. An elastic motor mount employed in motor mount damping regulatable to be variable by having at least one elastic shock-absorption element operational within a common fixed housing between the latter and a connecting element on one side thereof engaging said shock absorption element collectively being movable within and relative to said housing and that together therewith absorbs motor weight, and also having an external source of damping fluid therewith;

the improvement therewith comprising means forming a closed-off hollow space subdivided into two chamber portions thereof with an overflow region centrally therebetween as well as a connecting fitting that projects through the overflow region centrally thereof provided within said housing, and a damping fluid within said hollow space communicating centrally via the overflow region and through said connecting fitting with the external source of damping fluid for receiving varying amounts of said damping fluid therefrom so that elastic motor mount damping is regulatable during operation in a manner adaptable optimally to take up vibrations or oscillations in a range between short-stroke, high frequency acoustical vibrations or oscillations and also long-stroke, low-frequency deflections such as via roadway shocks, said connecting element engaging and surrounding said connecting fitting to maintain position thereof relative to said overflow region through which damping fluid communicates to effect expansion and contraction of the closed-off hollow space surrounding said connection element.

2. An elastic motor mount according to claim 1, in which said hollow space is formed at least in part by said connecting element, which is furthermore in engagement with said connecting fitting that communicates with said hollow space and a conduit which leads to said source of damping fluid so as to effect said communication between said hollow space and said source of damping fluid; and a regulatable pressure pump provided in said conduit selectively to convey said damping fluid to and from said hollow space.

3. An elastic motor mount according to claim 2, in which said housing has walls which face said connecting element, with said hollow space at least partially being formed internally of said walls and said connecting element.

4. An elastic motor mount according to claim 3, which includes flexible diaphragm elements which at least partially delimit said hollow space, and which are supported by said connecting element and at least indirectly by said housing via stop cushions.

* * * * *